Patented Mar. 7, 1933

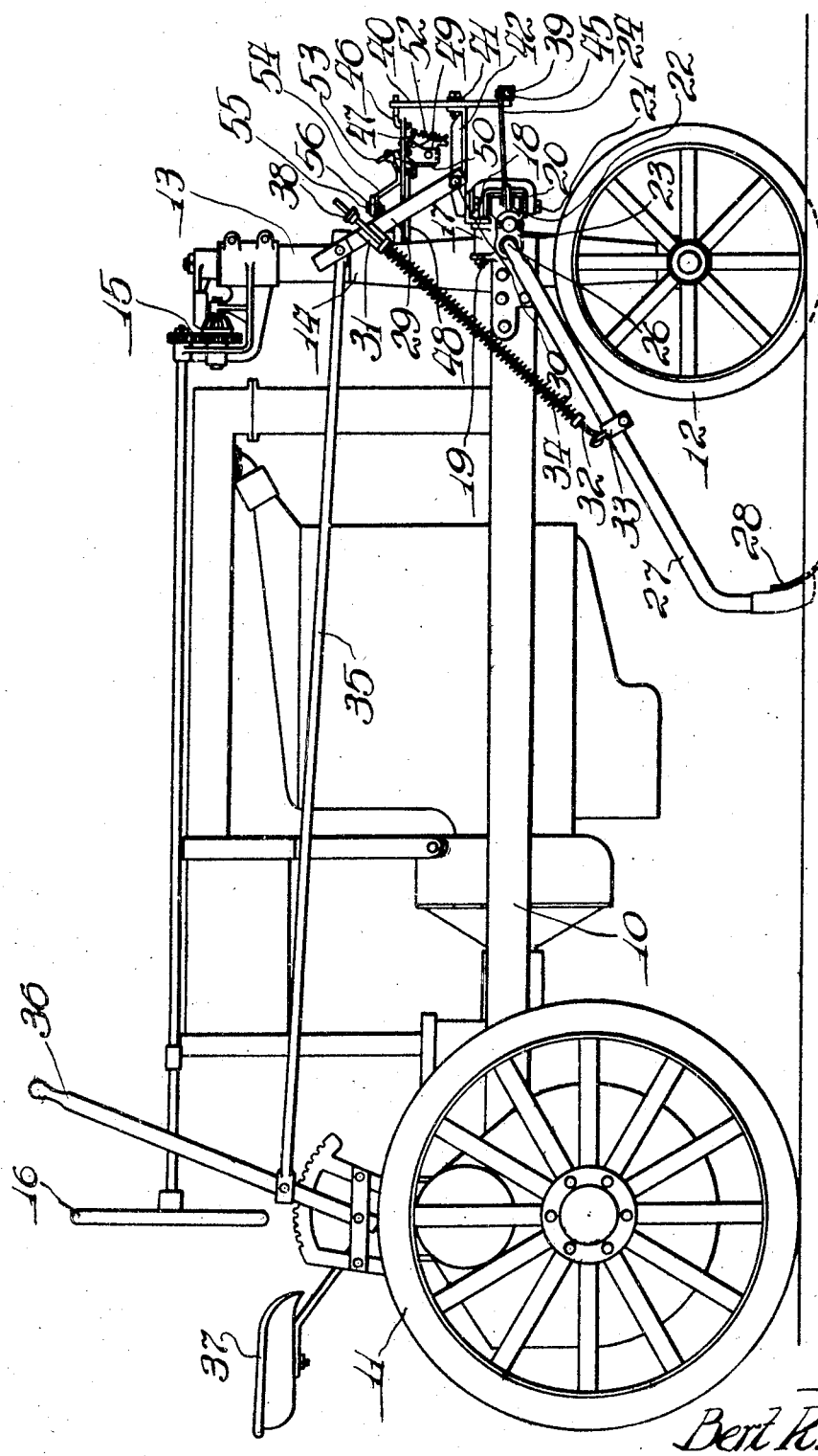

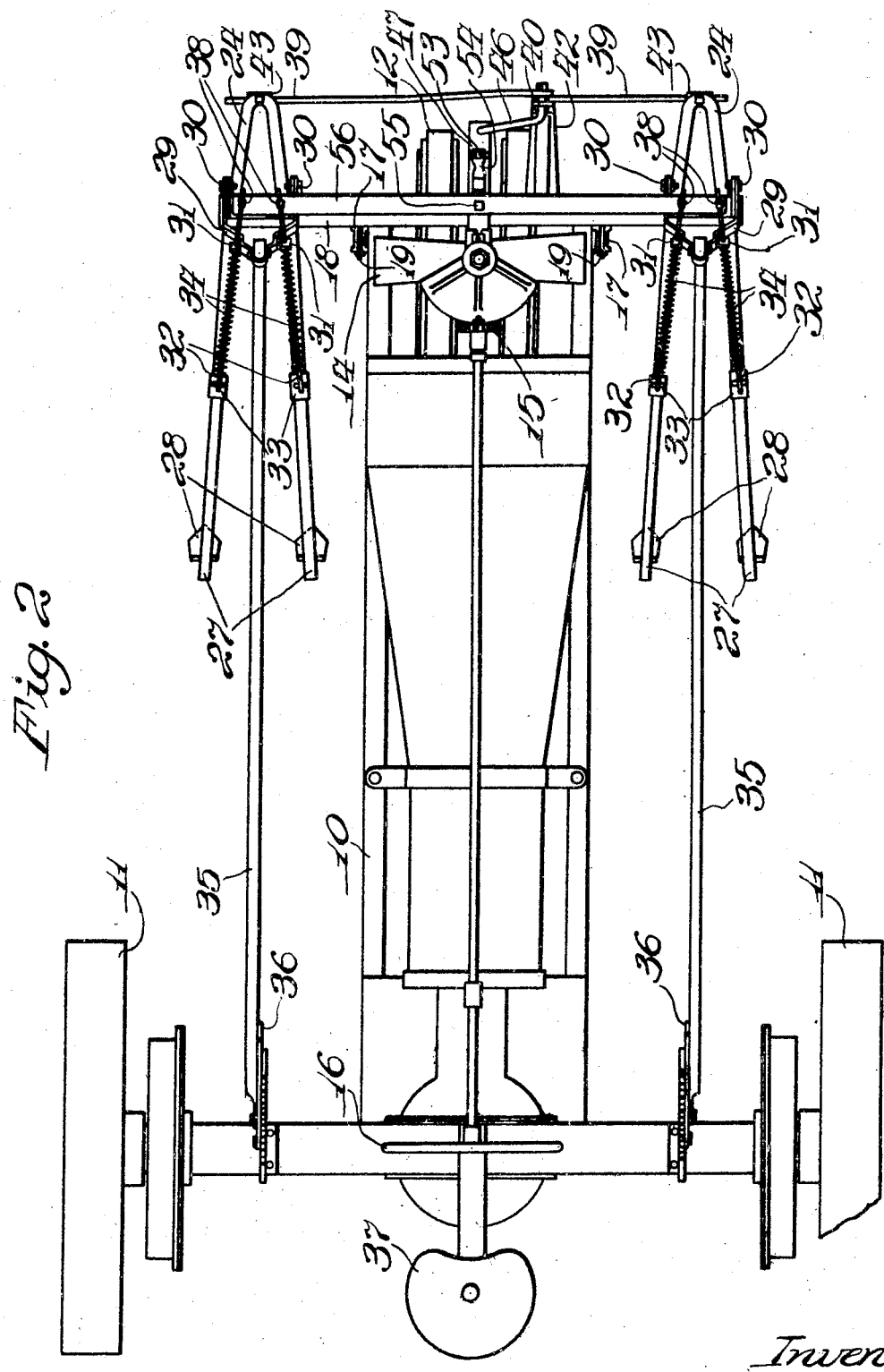

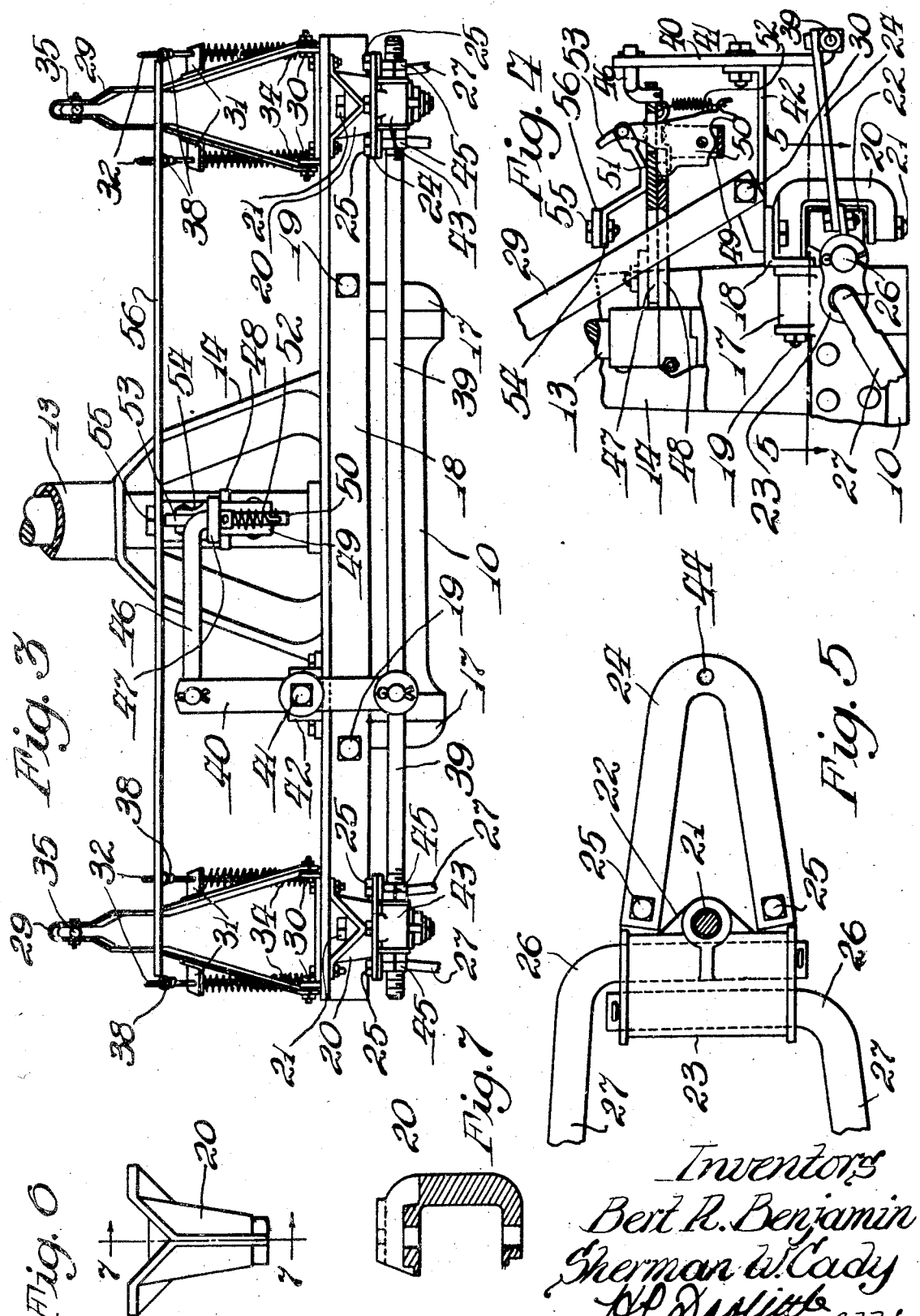

1,899,932

UNITED STATES PATENT OFFICE

BERT R. BENJAMIN, OF OAK PARK, AND SHERMAN W. CADY, OF CANTON, ILLINOIS, ASSIGNORS TO INTERNATIONAL HARVESTER COMPANY, A CORPORATION OF NEW JERSEY

TRACTOR CULTIVATOR

Application filed May 6, 1932. Serial No. 609,624.

The present invention relates to tractor cultivators and more particularly to improvement in the structure for effecting shifting or plant dodging movements of the earth working tools.

The main object of the invention is to provide a simple and light cultivator attachment for tractors of the row-crop type having novel and efficient means for pivotally supporting the trailing cultivator beams in such manner that quick lateral movement of the cultivating tools can be easily effected while traveling at comparatively high speed along plant rows.

The foregoing as well as other objects and advantages, which will become obvious from the detailed description following, are attained by the structure illustrated in the accompanying drawings, where:

Figure 1 is a side elevation of a row-crop tractor with the cultivator attachment mounted thereon;

Figure 2 is a similar plan view;

Figure 3 is a detail front view of the attachment on a larger scale;

Figure 4 is a detail side view of the structure shown in Figure 3;

Figure 5 is an enlarged detail, sectional view on the line 5—5 of Figure 4;

Figure 6 is a detail view of a pivot bracket forming part of the cultivator attachment; and, Figure 7 is a sectional view of the same bracket on the line 7—7 of Figure 6.

In the present instance the invention is illustrated in combination with a row-crop tractor of the type having a comparatively narrow main frame or body 10 supported on widely spaced rear traction wheels 11 adapted to span two plant rows such as corn or cotton and having dirigible supporting means at the front, such as a centrally positioned steering truck 12. The steering truck includes an upright standard 13 swiveled in a front cross member or head 14 on the tractor, which standard is steered through suitable gearing 15 at its upper end which transmits movement of the steering rod and wheel 16.

On the forward corners of the tractor body at each side of the crosshead, suitable brackets 17 are provided. These brackets are formed with longitudinally extending bolt receiving sockets and serve to connect an implement supporting member 18 extending across the front end of the tractor and projecting from each side thereof, as best seen in Figure 2. The supporting member 18 may consist of an angle iron bar having a vertical web clamped to the bracket 17 by bolts 19 and a horizontal web extending forwardly. At each end thereof the implement supporting member 18 has secured thereto a pivot bracket 20. This bracket is preferably bolted to the under side of the horizontal web of the member 18 and depends therefrom. It is preferably formed as a yoke shaped piece open rearwardly, and the arms of this pivot bracket 20 are provided with openings for a pivot member or pin 21, on which there is mounted a coupling member 22 (Fig. 5). The coupling member 22 is formed with a tool carrying portion or body 23 which is shown as extending rearwardly and with a forwardly extending, rigid arm 24 illustrated as a single bar bent into V shape and having its arms bolted at 25 to the body of the coupling member. The portion 23 of the coupling member is formed with transverse, horizontal pivot openings best seen in Figures 4 and 5. These openings receive the bent ends 26 of trailing cultivator beams 27 carrying earth working tools, such as shovels 28. This construction permits the beams to be raised and lowered, but holds them rigid as to lateral movement in relation to the coupling member.

Above each coupling member there is mounted on the supporting member 18 a lifting arm 29, which may be of yoke shape illustrated with the arms thereof pivoted at 30 to suitable lugs on the upper surface of the horizontal web of the supporting member 18. Intermediate its ends the arms of the yoke shaped member 29 are provided with laterally extending ears 31, which have openings to slidably receive the lifting links 32 which are connected to the respective cultivator beams, as at 33. Each lifting link carries the usual pressure spring 34, which is confined between a collar on the link and the ear 31 on the lifting arm 29. The upper end of the lifting arm 29 is pivoted to a rearwardly extending actuating shaft 35, which is connected to a hand lever 36 mounted on the rear axle structure of the tractor in convenient position to the driver's station or seat at 37. With this construction, it will be seen that forward rocking movement of the respective levers 36 will correspondingly rock the arm 29, causing the ears 31 to engage suitable stops 38 on the lifting links 32 during lifting movement, thereby raising the beams, or, upon reverse or lowering movement, causing the lugs 31 to press the springs 34 to force the earth working tools under the soil.

In order to effect quick and easy plant dodging movements of the cultivating tools, the forwardly extending arms 24 on the respective coupling members are pivotally connected by links 39 with the lower end of a rocker arm 40 pivoted intermediate its ends at 41 to a suitable bracket 42 extending forwardly from the supporting member 18. The outer ends of the links 39 are preferably screw-threaded and extended through collars 43 mounted on depending pivot bolts held in an opening 44 in the forward end of each arm 24. Set bolts 45 are carried by the respective links at each side of the sleeve 43. thereby providing for desired adjustment of the links on the coupling members. The rocker arm 40 is preferably actuated by means of a connecting link 46 which is pivotally connected to the forward end of a forwardly extending arm 47 loosely or rotatably mounted on the standard 13 of the steering truck immediately above a similar, but shorter, arm 48 (Figure 4), which is fixed to the standard 13 for movement therewith. The loose or free arm 47 is formed with a depending bracket 49 on which there is pivoted a latch member 50 having a portion adapted to engage a notch 51 in the forward end of the fixed arm 48, and normally held in said notch by a spring 52 connected at one end to a downward extension on the pawl and suitably anchored at the other end on the loose arm 47. The pawl 50 is formed with an upwardly extending tail piece 53 which passes through an opening or slot in the end of the loose arm 47 at a point beyond the end of the fixed arm 48. The projecting tail piece 53 of the pawl is pivotally connected to a support 54, which is curved rearwardly and upwardly, as illustrated, and rests on the upper surface of the loose arm 47. The rear end of the curved support 54 is secured at 55 to the middle of a transversely extending control bar 56, best seen in Figure 3, the ends of which are positioned just forwardly of the rock-arms 29. Therefore, when one or both of the arms 29 are rocked forwardly to lift the cultivator beams, the control bar 56 will be pushed forwardly, thereby pushing the tail 53 of the latch 50 forwardly and releasing the latch from the notch in the fixed arm 48. When this occurs, the arm 48 and the standard 13 of the steering truck which carries that arm become free to move independently of the loose arm 47, and no motion is transmitted to the coupling members 22 under those conditions. When, however, the latch 50 is engaged in the forward notch of the fixed arm 48, which is the case when the cultivator beams are lowered, the arms 47 and 48 will swing in unison as steering movement is imparted to the dirigible truck, and this movement will be transmitted through rock-arm 40 and links 39 to the coupling members 22, so that these will be swung in unison on pivots 21, to thereby shift the cultivating tools in the direction of steering movement.

The construction above described accordingly affords a cultivator attachment having simple structure for effecting quick dodging movement of the cultivating tools as the tractor follows the plant rows and for disconnecting the gang shifting mechanism from the steering control means when the cultivator beams are raised, as in turning about at the ends of the rows.

The preferred embodiment of the invention, which has been illustrated and described by way of example, is, of course, subject to modification without departure from the scope of the invention as defined in the following claims.

What is claimed is:

1. The combination with a tractor having a dirigible wheeled support at its forward end, of implement supporting means secured to the forward portion of the tractor to project outwardly at each side thereof, a coupling member mounted on the projecting portion of said supporting means at each side of the tractor for angular movement about an axis transverse to said projecting portion, earth working means connected to each coupling member to move therewith, and means for transmitting angular movement of the dirigible support to the coupling members.

2. The combination of claim 1, each coupling member having extensions at opposite sides of its axis of movement, one extension having the earth working means connected thereto and the other being connected to receive movement from the dirigible support.

3. The combination with a tractor having a dirigible wheeled support at its forward end, of an implement supporting member mounted across the forward end of the tractor and projecting at each side thereof, cultivator beams trailing from each end of said supporting member and connected thereto by a coupling member pivoted on the supporting member and swingable with the cultivator beams towards and from the tractor, a rigid arm extending from each coupling member, and links pivotally connecting said arms with the dirigible supporting means for joint movement.

4. The combination with a tractor having a dirigible wheeled support at its forward end, of an implement supporting member mounted across the forward end of the tractor and projecting outwardly at each side thereof, a vertical pivot on each end of the implement supporting member, a coupling member mounted on each pivot and having portions extending forwardly and rearwardly thereof respectively, cultivator beams pivoted to the rearwardly extending portion for movement vertically, and links pivotally connecting the forwardly extending portion of each coupling member with the dirigible supporting means for joint movement.

5. The combination with a tractor having a dirigible truck supporting its forward end including a vertical standard swiveled on the tractor, of an implement supporting member mounted across the front of the tractor and projecting outwardly at each side thereof, a vertical pivot on each end of said supporting member, a coupling member mounted on each pivot having a forwardly extending rigid arm and a body formed with horizontal pivot openings, trailing implement beams having pivot portions mounted in said openings, a rigid arm extending from the standard of the truck, links pivotally connecting said arm with the arms of the coupling members including a releasable connection, lifting arms pivoted on the supporting member and connected to the implement beams, means for rocking the lifting arms to raise and lower the beams, and means positioned for engagement by the lifting arms for releasing the coupling members from the arm on the truck standard.

6. The combination with a tractor, of an implement supporting member mounted across the forward end of the tractor and projecting at each side thereof, a coupling member mounted on each end of the supporting member for rocking movement about a substantially upright axis, control means on the tractor operable from the driver's station for rocking the coupling members in unison, and implement carrying beams trailing from each coupling member and movable therewith.

In testimony whereof we affix our signatures.

BERT R. BENJAMIN.
SHERMAN W. CADY.